(12) United States Patent
Cook et al.

(10) Patent No.: US 10,091,130 B2
(45) Date of Patent: *Oct. 2, 2018

(54) RESOURCE USAGE MANAGEMENT IN A STREAM COMPUTING ENVIRONMENT

(71) Applicant: International Business Machines Corporation, Armonk, NY (US)

(72) Inventors: Alexander Cook, Chaska, MN (US); Cory J. Kleinheksel, Ames, IA (US); David M. Koster, Rochester, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,436

(22) Filed: Sep. 14, 2017

(65) Prior Publication Data
US 2018/0198730 A1 Jul. 12, 2018

Related U.S. Application Data

(63) Continuation of application No. 15/401,007, filed on Jan. 7, 2017.

(51) Int. Cl.
*G06F 11/30* (2006.01)
*H04L 12/917* (2013.01)
*H04L 29/06* (2006.01)

(52) U.S. Cl.
CPC ............ *H04L 47/76* (2013.01); *H04L 65/601* (2013.01)

(58) Field of Classification Search
CPC . G06F 9/54; G06F 9/50; G06F 9/5088; G06F 9/526; G06F 9/4893; G06F 9/4856; G06F 9/5011; G06F 9/5072; G06F 9/5094; G06F 9/542; G06F 9/45533; G06F 9/5005; G06F 17/30088; G06F 17/30516; G06F 17/30; G06F 1/32; G06F 1/3296;
(Continued)

(56) References Cited

U.S. PATENT DOCUMENTS

2014/0007097 A1\* 1/2014 Chin ................... G06F 9/45533
718/1
2015/0207749 A1 7/2015 Cao et al.
(Continued)

FOREIGN PATENT DOCUMENTS

WO 2016074759 A1 5/2016

OTHER PUBLICATIONS

IBM: List of IBM Patents or Patent Applications Treated As Related (Appendix P), Oct. 3, 2017, pp. 1-2.
(Continued)

*Primary Examiner* — Tu Nguyen
(74) *Attorney, Agent, or Firm* — Michael A. Petrocelli

(57) ABSTRACT

Disclosed aspects relate to resource usage management in a stream computing environment that includes a set of hosts having a set of processing elements which has a set of stream operators. A first activity indicator may be detected for a first subset of the set of stream operators. A resource action for performance with respect to the first subset of the set of stream operators may be determined based on the first activity indicator. The resource action may be performed with respect to the first subset of the set of stream operators to benefit resource usage in the stream computing environment.

1 Claim, 12 Drawing Sheets

(58) Field of Classification Search
CPC .... G06F 1/3072; G06F 15/173; H04L 12/911; H04L 65/60; H04L 47/70; H04L 29/06; H04L 41/0896
USPC ......................................................... 709/223
See application file for complete search history.

(56) References Cited

U.S. PATENT DOCUMENTS

2015/0288590 A1* 10/2015 Mason ................ H04L 67/1027 709/224
2016/0041852 A1 2/2016 Suarez Gracia et al.
2017/0060465 A1 3/2017 Branson et al.

OTHER PUBLICATIONS

Wikipedia, the free encyclopedia; "Hibernation (computing)"; <https://en.wikipedia.org/wiki/Hibernation_(computing)>, printed on Sep. 21, 2016, pp. 1-4.
Schwartz; "How to Make Your Battery Last Longer—Turn Off Chatty Apps, Part 1"; Qualcomm Developer Network; <https://developer.qualcomm.com/blog/how-make-your-battery-last-longer-turn-chatty-apps-part-1>; Nov. 10, 2014, pp. 1-8.
Wikipedia, the free encyclopedia; "Sleep mode"; <https://en.wikipedia.org/wiki/Sleep_mode>, printed on Sep. 21, 2016, pp. 1-4.
Pending U.S. Appl. No. 15/401,007, filed Jan. 7, 2017, entitled "Resource Usage Management in a Stream Computing Environment", pp. 1-76.

* cited by examiner

RESOURCE USAGE MANAGEMENT IN A STREAM COMPUTING ENVIRONMENT

BACKGROUND

This disclosure relates generally to computer systems and, more particularly, relates to managing resource usage in a stream computing environment. The amount of data that needs to be managed by enterprises is increasing. Resource usage management may be desired to be performed as efficiently as possible. As data needing to be managed increases, the need for resource usage management efficiency may increase.

SUMMARY

Aspects of the disclosure relate to resource usage management in a stream computing environment that includes a set of hosts having a set of processing elements which has a set of stream operators. Aspects of the disclosure relate to dynamically modifying stream operators in a stream computing environment based their activity. For instance, portions of an operator graph may be dynamically deactivated or activated while maintaining an application in a running state. In embodiments, tuples may be temporarily batched for processing after disabled processing elements are reactivated. In embodiments, a machine learning technique may be used to evaluate tuple flow rates to branches or channels of an operator graph to identify stream operators that may be candidates for modification. In embodiments, processing elements associated with activity below a threshold level may be isolated on host machines that are separate from highly-used processing elements. Stream operators may be tagged with annotations that indicate whether or not they are candidates for activation or deactivation.

Disclosed aspects relate to resource usage management in a stream computing environment that includes a set of hosts having a set of processing elements which has a set of stream operators. A first activity indicator may be detected for a first subset of the set of stream operators. A resource action for performance with respect to the first subset of the set of stream operators may be determined based on the first activity indicator. The resource action may be performed with respect to the first subset of the set of stream operators to benefit resource usage in the stream computing environment.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
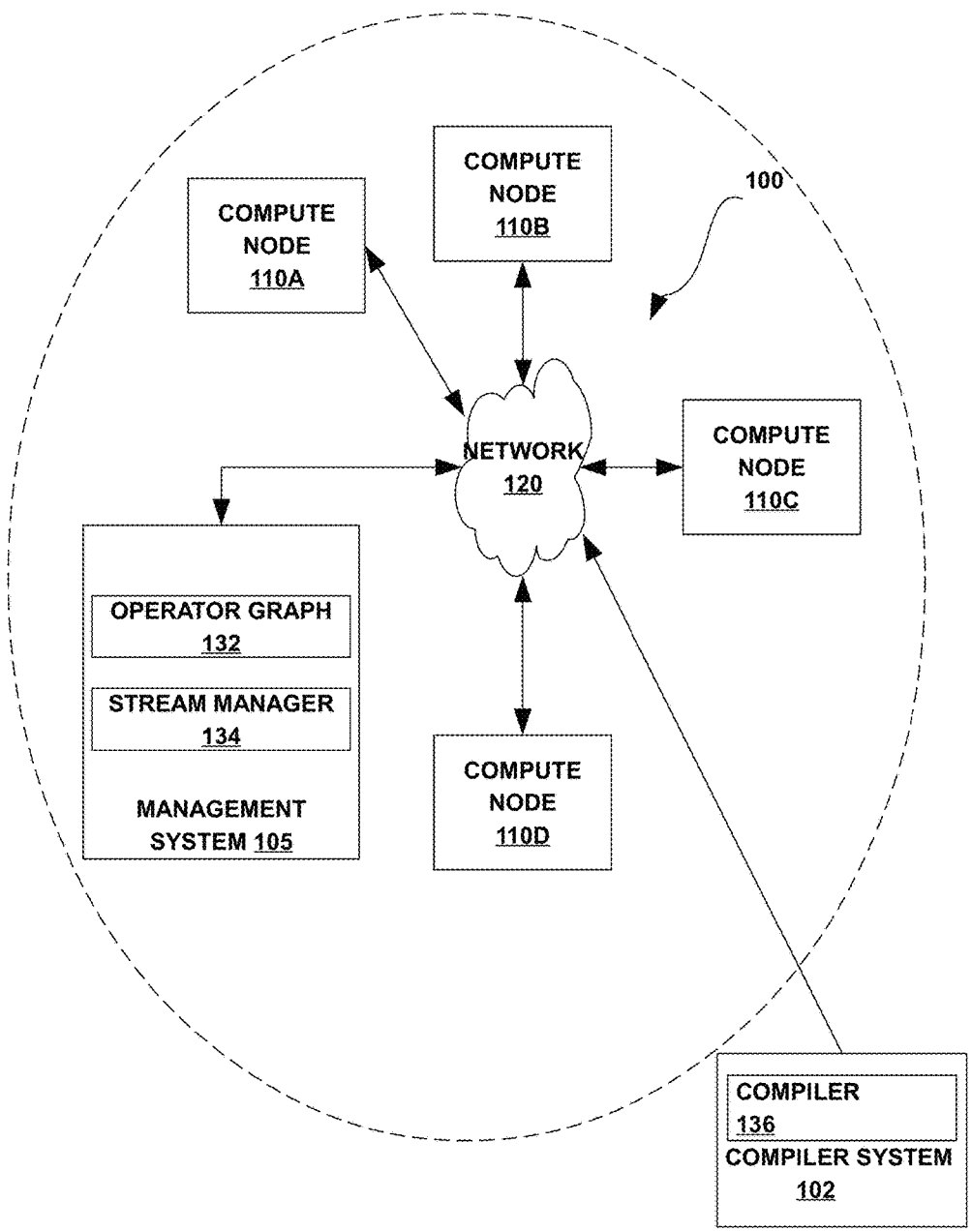
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to resource usage management in a stream computing environment that includes a set of hosts having a set of processing elements which has a set of stream operators. Aspects of the disclosure relate to dynamically modifying stream operators in a stream computing environment based their activity (e.g., degree of usage). For instance, portions of an operator graph may be dynamically deactivated (e.g., shut down, sleep, hibernate) or activated while maintaining an application in a running state. In embodiments, tuples may be temporarily batched (e.g., stored) for processing after disabled processing elements are reactivated. In embodiments, a machine learning technique may be used to evaluate tuple flow rates to branches or channels of an operator graph to identify stream operators that may be candidates for modification (e.g., activation or deactivation). In embodiments, processing elements associated with activity below a threshold level may be isolated on host machines that are separate from highly-used processing elements. Stream operators may be tagged with annotations that indicate whether or not they are candidates for activation or deactivation. Leveraging dynamic activation and deactivation with respect to stream operators based on usage activity may be associated with resource management efficiency, network bandwidth, and application performance.

Stream computing relates to a distributed computing environment where data maintained in tuples is acted upon by stream operators, and sometimes modified and transformed for transmission to subsequent stream operators. Operators may be linked together to assemble an operator graph, which may represent an executable portion of a particular streaming application. Aspects of the disclosure relate to the recognition that, in some situations, some portions (e.g., branches, channels) may be associated with reduced data traffic or be infrequently utilized, while still consuming system resources. As an example, in a particular stream computing application, 75% of the stream operators in an operator graph may be used 90% of the time, and the remaining 25% of the stream operators may only be used occasionally, or in specific situations. Accordingly, aspects of the disclosure relate to performing a resource action to modify (e.g., temporarily deactivate/disable) one or more stream operators of the operator graph to positively impact system resource usage with respect to the stream computing environment. In this way, system resources may be freed for usage by other portions of the application.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In some cases a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, map, list, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to a system, method, and computer program product for resource usage management in a stream computing environment that includes a set of hosts having a set of processing elements which has a set of stream operators. A first activity indicator for a first subset of the set of stream operators may be detected. Based on the first activity indicator for the first subset of the set of stream operators, a resource action for performance with respect to the first subset of the set of stream operators may be determined. The resource action may be performed with respect to the first subset of the set of stream operators to benefit resource usage in the stream computing environment.

In embodiments, a first stream operator hint which relates to the first activity indicator may be established in association with a first stream operator of the first subset of the set of stream operators. The first stream operator hint may be detected. Based on the first stream operator hint, it may be determined to perform the resource action with respect to the first stream operator. The resource action may be performed with respect to the first stream operator to benefit resource usage in the stream computing environment. In embodiments, the first stream operator hint may be structured to indicate a resource action candidacy factor for the first stream operator. In embodiments, a placement arrangement with respect to the first subset of the set of stream operators and the set of hosts may be determined based on the first activity indicator for the first subset of the set of stream operators. Based on the placement arrangement, the first subset of the set of stream operators may be placed on a first subset of the set of hosts. In embodiments, a shut-down mode, a hibernation mode, a sleep mode, or a hybrid-standby mode may be carried out with respect to the first subset of the set of stream operators to perform the resource action with respect to the first subset of the set of stream operators. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
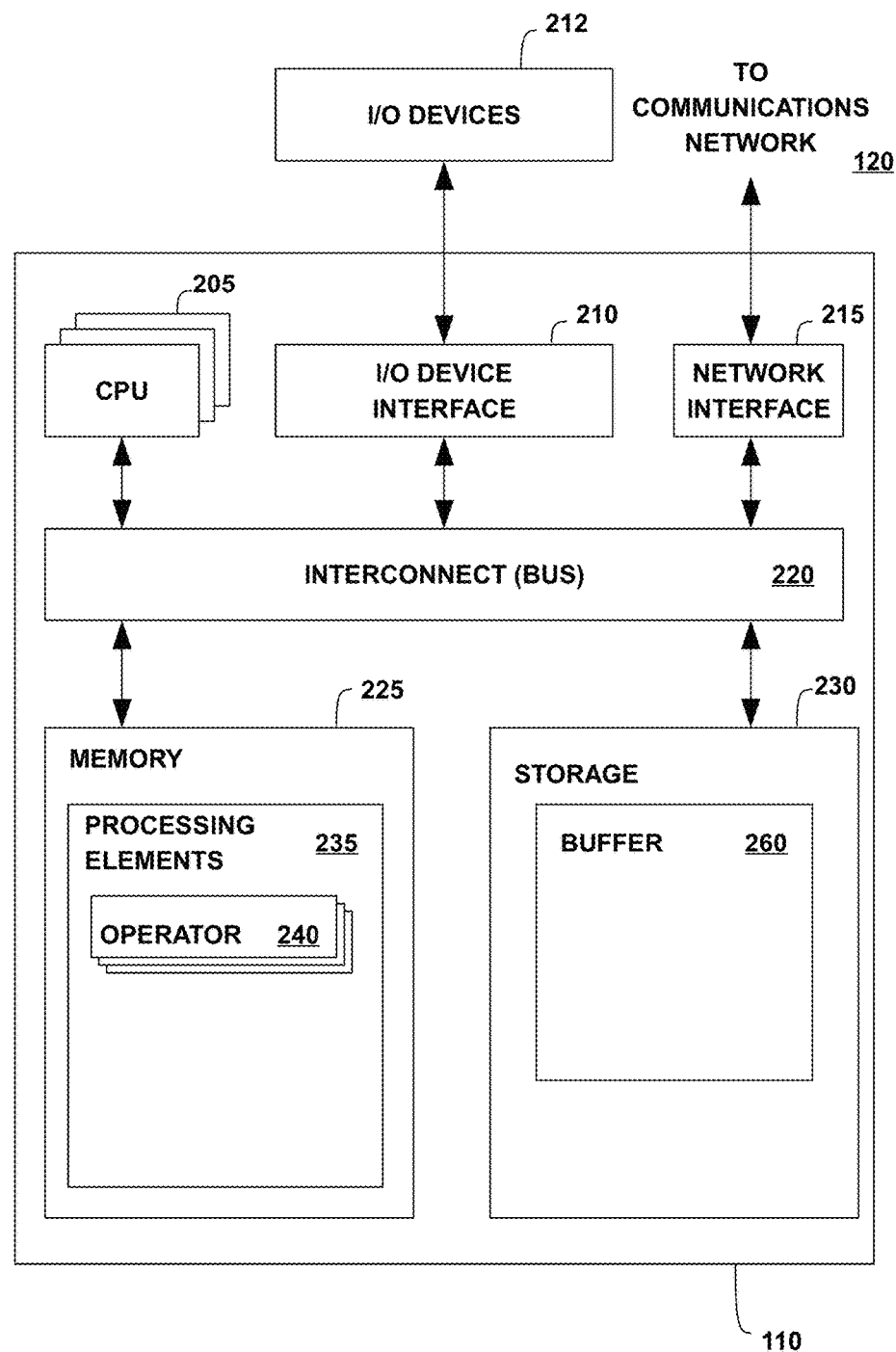
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
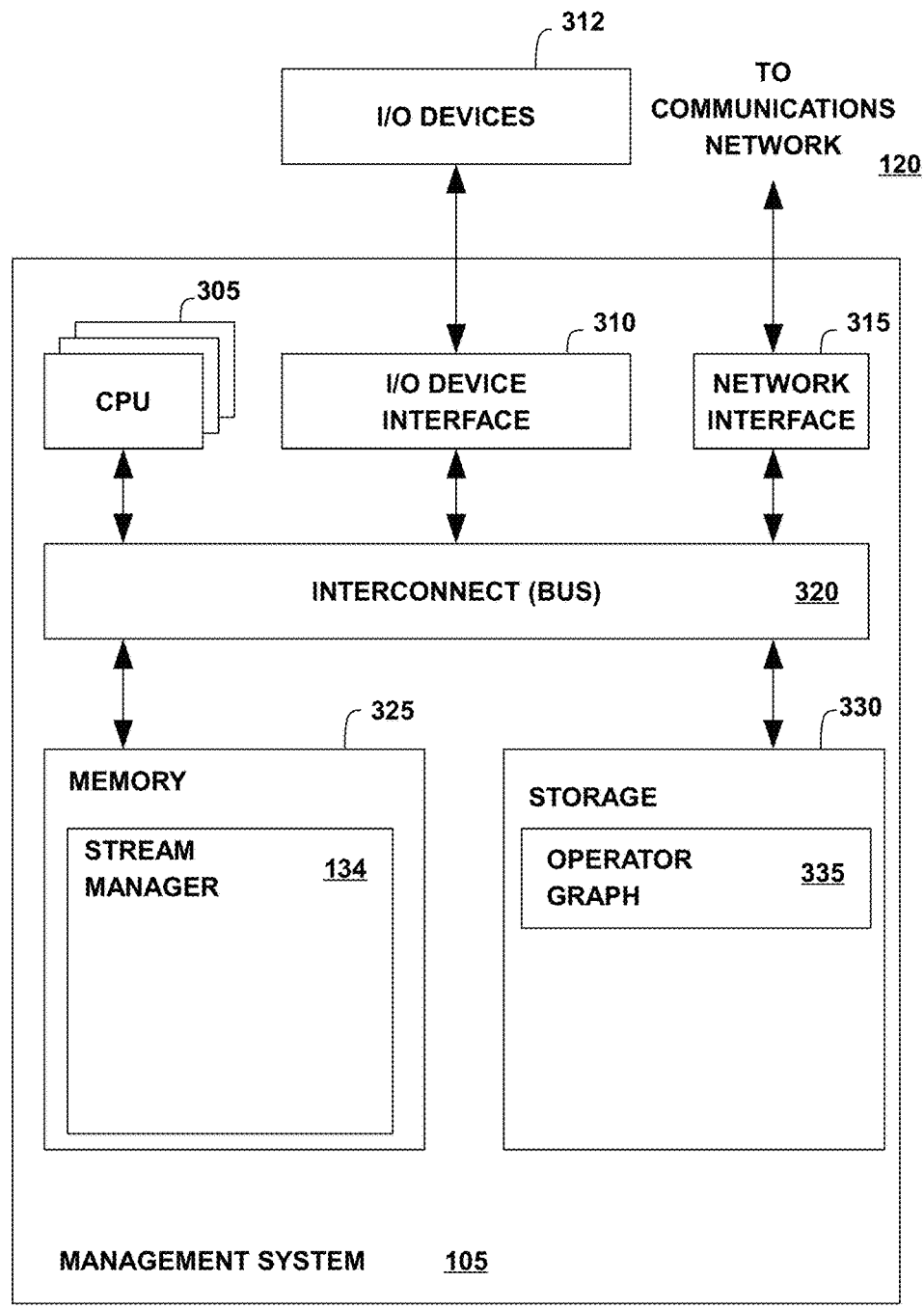
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
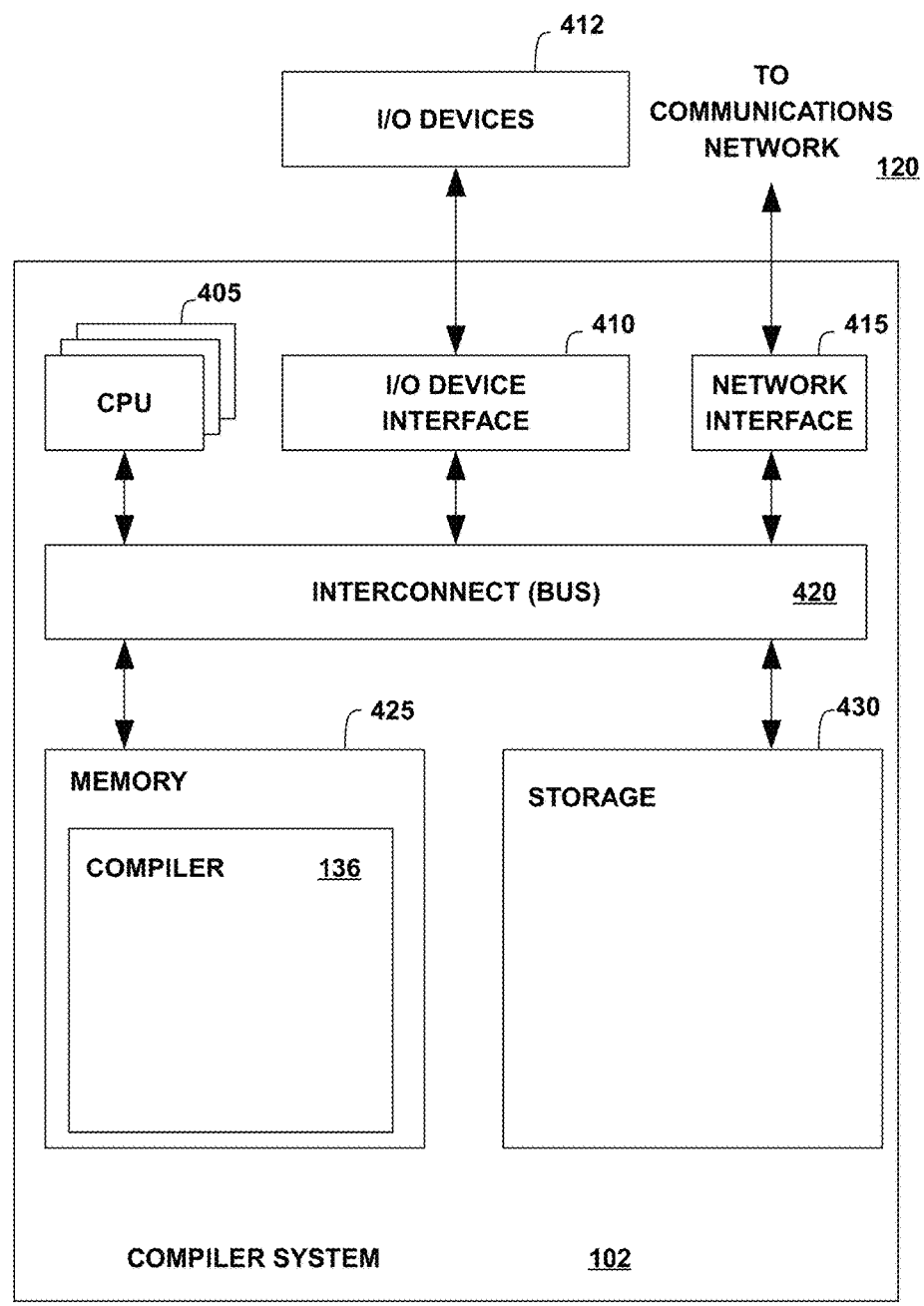
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
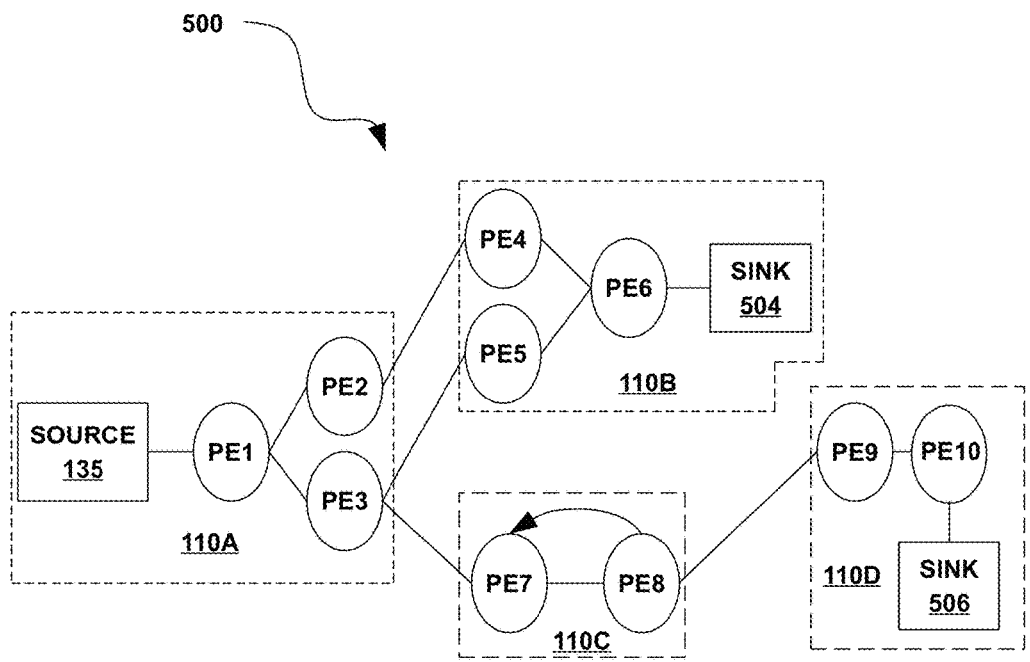
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
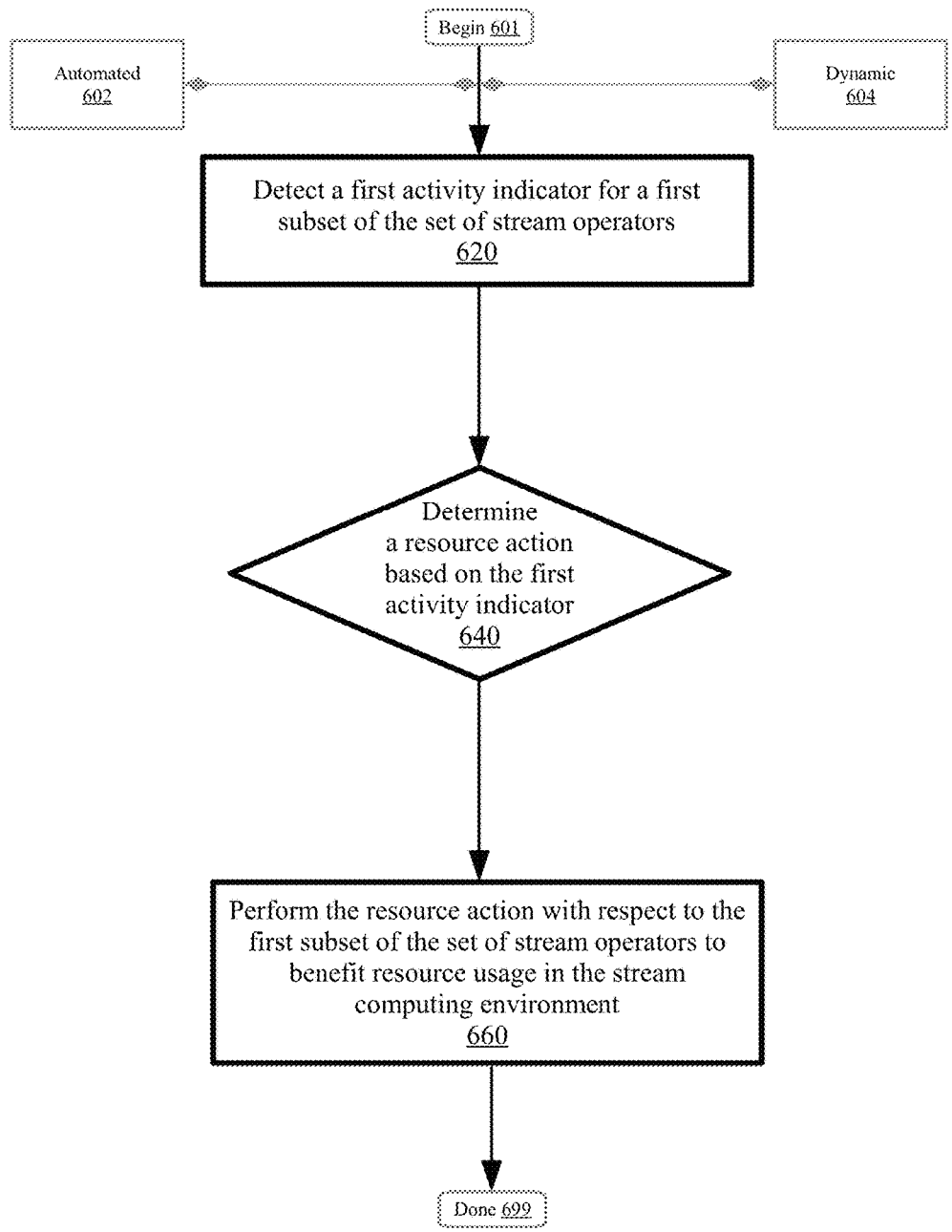
FIG. 6 is a flowchart illustrating a method for resource usage management in a stream computing environment that includes a set of hosts having a set of processing elements which has a set of stream operators, according to embodiments.

FIG. 6 is a flowchart illustrating a method 600 for resource usage management in a stream computing environment that includes a set of hosts having a set of processing elements which has a set of stream operators, according to embodiments. The set of processing elements may include logical units of a stream computing environment that are configured to perform one or more functions within a streaming application (e.g., executable software program). The set of processing elements may include a set of stream operators. The set of stream operators may be configured to perform operations (logic-based analysis, attribute modification) on data (e.g., tuples) as part of the stream computing application. In embodiments, the set of processing elements may be deployed on a set of hosts. The set of hosts may include computer hardware devices such as servers or workstations, virtual processing nodes such as virtual machines or logical partitions, mobile computing devices such as smartphones or tablets, or other types of computing nodes configured to support stream computing environments. Aspects of the disclosure relate to the recognition that, in some situations, portions of stream computing environments may be associated with activity below a threshold level (e.g., stream operators may be inactive, idle, or receive a low number of tuples for processing). Accordingly, aspects of the disclosure relate to determining and performing a resource action to benefit resource usage (e.g., deactivate unused portions of an operator graph to reduce system resource usage) in the stream computing environment. As an example, a branch of an operator graph including stream operators that are associated with activity below a threshold level may be deactivated (e.g., sleep mode, hibernation mode) in order to free up system resources. Aspects of FIG. 6 relate to determining and performing a resource action based on an activity indicator detected with respect to a subset of stream operators. Leveraging dynamic activation and deactivation with respect to stream operators based on usage activity may be associated with resource management efficiency, network bandwidth, and application performance. The method 600 may begin at block 601.

In embodiments, the detecting, the determining, the performing, and other steps described herein may each occur in an automated fashion at block 602. In embodiments, the detecting, the determining, the performing, and other steps described herein may be carried out by an internal resource usage management module maintained in a persistent storage device of a stream application host node or locally connected hardware device. In embodiments, the detecting, the determining, the performing, and other steps described herein may be carried out by an external resource usage management module hosted by a remote computing device or server (e.g., accessible via a subscription, usage-based system, or other service model). In this way, aspects of resource usage management may be performed using automated computing machinery without user intervention or manual action. Other methods of performing the steps described herein are also possible.

In embodiments, the detecting, the determining, the performing, and other steps described herein may each occur in a dynamic fashion to streamline resource usage management at block 604. For instance, the detecting, the determining, the performing, and other steps described herein may occur in real-time, ongoing, or on-the-fly. As an example, one or more steps described herein may be performed in a dynamic fashion (e.g., activity indicators for subsets of stream operators may be detected and analyzed in real-time, and portions of an operator graph may be dynamically activated or deactivated) in order to streamline (e.g., facilitate, promote, enhance) resource usage management in the stream computing environment. Other methods of performing the steps described herein are also possible.

At block 620, a first activity indicator for a first subset of the set of stream operators may be detected. Generally, detecting can include sensing, recognizing, discovering, ascertaining, or otherwise identifying the first activity indicator for a first subset of the set of stream operators. As described herein, the set of stream operators may include logical processing units configured to perform operations (logic-based analysis, attribute modification) on data (e.g., tuples) as part of a stream computing application. In embodiments, the set of stream operators may include all the stream operators and processing elements included in a particular operator graph. In embodiments, the set of stream operators may include a first subset of stream operators. The first subset of stream operators may include a group, batch, or portion of one or more stream operators of the set of stream operators. For instance, the set of stream operators may include a branch or channel of an operator graph that includes a number of associated stream operators. In embodiments, the first subset of the set of stream operators may be associated with a first activity indicator. The first activity indicator may include an index, gauge, expression, or representation of the degree or extent of usage of the first subset of the set of stream operators. The first activity indicator may include a quantitative expression of the usage of the first set of stream operators derived from a set of usage statistics. For instance, the first set of stream operators may be associated with a first activity indicator that indicates the average tuple throughput rate for the first set of stream operators (e.g., 300 tuples per second), the length of time between tuple arrival (e.g., 2 seconds), a percentage of maximum utilization (e.g., 15%, 40%), a time frame associated with peak usage (e.g., 8:00 AM to 10:00 AM) or other type of statistic-derived utilization indication. In embodiments, the first activity indicator may include an annotation, marker, note, tag, or label that indicates the relative usage level of the first set of stream operators. As an example, the first set of stream operators may be associated with an annotation formulated by a machine learning technique (e.g., or tagged by a developer) that indicates that the first set of stream operators may be used in particular situations such as when tuple traffic achieves a threshold level, during particular times of day, for certain types of tuple processing operations, or the like. In embodiments, detecting the first activity indicator may include analyzing a set of archived usage data for the set of stream operators, and ascertaining the first activity indicator based on the historical usage data for the first subset of stream operators. In embodiments, detecting the activity indicator may include receiving a notification (e.g., from a machine learning technique or application developer) that characterizes the relative activity of the first subset of stream operators. Other methods of detecting the first activity indicator for the first subset of stream operators are also possible.

At block 640, a resource action for performance with respect to the first subset of the set of stream operators may be determined. The resource action may be determined based on the first activity indicator for the first subset of the set of stream operators. Aspects of the disclosure relate to the recognition that, in some situations, deactivating stream operators that are associated with relatively low usage levels may positively impact resource usage of the stream computing environment. Generally, determining can include calculating, computing, identifying, formulating, or otherwise ascertaining the resource action for performance with respect to the first subset of the set of stream operators. The resource action may include a procedure, configuration modification, process, or other operation implemented to benefit resource usage in the stream computing environment. For instance, the resource action may include a modification to the operational mode of one or more stream operators of the set of stream operators. As examples, the resource action may include a procedure to configure one or more stream operators to a shut-down mode (e.g., turn-off, disable), a hibernation mode (e.g., medium-term resource saving mode), a sleep mode (e.g., short-term deactivation), a hybrid-standby mode (e.g., save resources while maintaining responsiveness) or the like. In embodiments, the resource action may be determined based on the first activity indicator. For instance, determining may include examining the first activity indicator with respect to a set of stream operator usage criteria (e.g., benchmarks that define average usage for stream operators) and ascertaining whether the first subset of stream operators achieve a threshold activity level. In certain embodiments, a first subset of stream operators that achieve the threshold activity level defined by the set of stream operator usage criteria may be maintained in the same operational state. In certain embodiments, in response to determining that a first subset of stream operators fail to achieve the threshold activity level, one or more resource actions for the first subset of stream operators may be identified to positively impact resource usage of the stream computing environment. As an example, a first activity indicator indicating a tuple throughput rate of 30 tuples per second may be compared with a threshold activity level of 100 tuples per second, and it may be ascertained that the first subset of stream operators fail to achieve the threshold activity level. Accordingly, a resource action for the first subset of stream operators may be selected to shut-down (e.g., deactivate) the first subset of stream operators, and reroute the tuples that were previously processed by the first subset of stream operators to other stream operators of the stream computing environment. Other methods of determining a resource action for the first subset of the set of stream operators based on the first activity indicator are also possible.

At block 660, the resource action may be performed with respect to the first subset of the set of stream operators to benefit resource usage in the stream computing environment. Generally, performing can include carrying-out, implementing, enacting, instantiating, completing, or otherwise executing the resource action with respect to the first subset of the set of stream operators. In embodiments, performing may include utilizing a streams management engine of the stream computing environment to implement the resource action determined based on the first activity indicator for the first subset of the set of stream operators. For instance, in certain embodiments, performing the resource action may include utilizing the streams management engine to modify the operating configuration or mode of the first subset of the set of stream operators. As an example, in response to determining a resource action to shut-down the first subset of the set of stream operators, the streams management engine may modify a set of operational parameters of the set of stream operators to deactivate them for tuple processing, such that they no longer use system resources (e.g., freeing up system resources for other tasks). In embodiments, performing the resource action may include utilizing the streams management engine to reroute data traffic within the stream computing environment. For instance, in response to deactivating the first subset of stream operators, the streams management engine may reroute tuples that were previously processed by the first subset of stream operators to other stream operators, or save the tuples (e.g., to memory or disk storage for later processing). Other methods of performing the resource action with respect to the first subset of stream operators are also possible.

Consider the following example. A call-center environment may utilize a stream computing application to facilitate voice-to-text conversion of customer service calls. The stream computing application may include an operating graph having 100 channels (e.g., branches) for processing tuples generated by customer service calls. In embodiments, as described herein, a first activity indicator may be detected for a first subset of the set of stream operators. The first activity indicator may indicate that the hours of 10:00 AM to 12:00 PM each day represent peak times, such that all 100 channels of the operating graph receive tuple volumes of 500 tuples per second or more, and that the hours of 2:00 PM to 4:00 PM each day represent a lull, where only 10 of the 100 channels receive tuple volumes of 500 tuples per second or more, 20 channels receive tuple volumes of approximately 250 tuples per second, and the remaining 70 channels receive tuple volumes of 80 tuples per second or less. As described herein, the first activity indicator may be compared to a set of stream operator usage criteria, and it may be ascertained that the 70 channels having tuple throughput rates of 80 tuples per second or less do not achieve a threshold activity level of 100 tuples per second. Accordingly, based on the first activity indicator, a resource action may be determined to shut-down the 70 channels of the operator graph that do not achieve the threshold activity level, such that computing resources may be freed for use by other tasks or applications. In certain embodiments, the resource action may be managed by a job scheduler, such that the 70 channels may be automatically configured to a shut-down mode each day between 2:00 PM and 4:00 PM, and automatically reactivated prior to peak call times. As described herein, the resource action may manage the tuple traffic of the operator graph, such that the tuples that were previously processed by the stream operators of the 70 channels may be processed by other stream operators of the operator graph, or are saved (e.g., in memory or disk storage) for later processing. Other methods of resource usage management in a stream computing environment are also possible.

Method 600 concludes at block 699. Aspects of method 600 may provide performance or efficiency benefits related to resource usage management. As an example, stream operators that are associated with an activity/usage level lower than a threshold activity level may be identified and targeted by a resource action. The resource action may configure the stream operators to a shut-down mode, a hibernation mode, a sleep mode, a hybrid-standby mode, or other operational mode to positively impact resource usage of the stream computing environment. Altogether, leveraging dynamic activation and deactivation with respect to stream operators based on usage activity may be associated with resource management efficiency, network bandwidth, and application performance.

Figure 7:
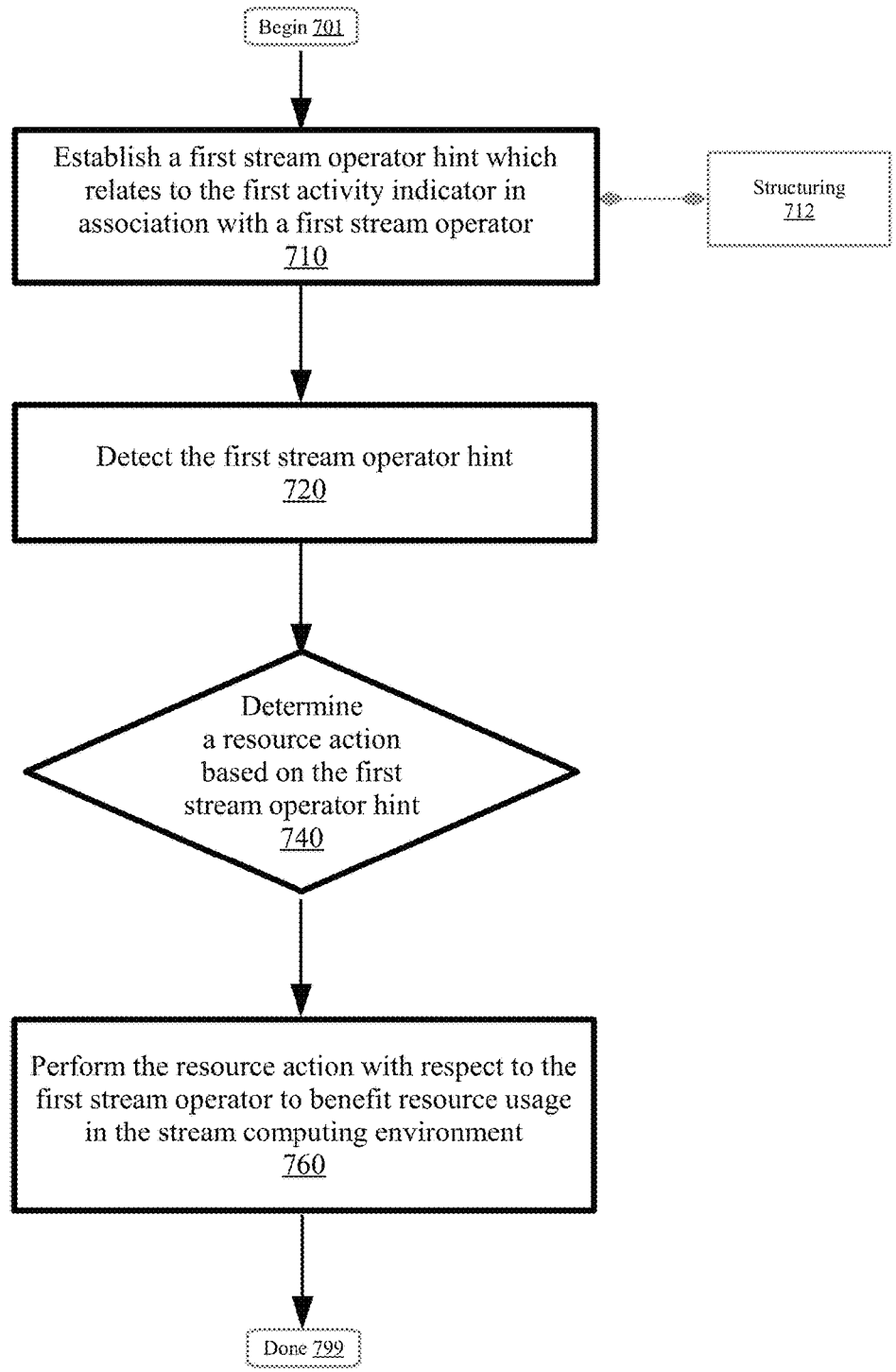
FIG. 7 is a flowchart illustrating a method for resource usage management in a stream computing environment that includes a set of hosts having a set of processing elements which has a set of stream operators, according to embodiments.

FIG. 7 is a flowchart illustrating a method 700 for resource usage management in a stream computing environment that includes a set of hosts having a set of processing elements which has a set of stream operators, according to embodiments. Aspects of the disclosure relate to the recognition that, in some situations, machine learning techniques or developers of stream computing applications may provide indications regarding particular stream operators that may be candidates for resource actions, or stream operators that should not be targeted by resource actions. Accordingly, aspects of the disclosure relate to a first stream operator hint that indicates the potential or lack of potential for a stream operator to be targeted by a resource action. Aspects of FIG. 7 relate to using the first stream operator hint to facilitate determination and performance of the resource action to benefit resource usage in the stream computing environment. The method 700 may begin at block 701.

In embodiments, a first stream operator hint which relates to the first activity indicator may be established at block 710. The first stream operator hint may be established in association with a first stream operator of the set of stream operators. Generally, establishing can include saving, linking, packaging, coupling, storing, attaching, appending, or otherwise bundling the first stream operator hint in association with a first stream operator of the set of stream operators. The first stream operator hint may include an annotation, comment, note, or other description that characterizes a relationship between the first stream operator and one or more resource actions. For instance, the first stream operator hint may include a comment by a developer of a stream computing application that indicates one or more resource actions that may be performed with respect to the stream operator to positively impact resource usage of the stream computing environment. In certain embodiments, the first stream operator hint may include a machine-language derived conclusion indicating recommended resource actions for performance with respect to the first stream operator. In embodiments, establishing may include embedding the first stream operator hint together with metadata of the first stream operator. For instance, in certain embodiments, the first stream operator may be tagged with a note in an integrated development environment (IDE) that indicates the first stream operator. In certain embodiments, a number of stream operator hints associated with different stream operators may be aggregated and displayed in an interface of the stream computing environment (e.g., such that a stream application administrator may see suggested/recommended resource actions for a number of stream operators). In certain embodiments, the first stream operator hint may be saved as a data entry in a stream operator hint database linked with the operator graph. Other methods of establishing the first stream operator hint in association with the first stream operator are also possible.

In embodiments, the first stream operator hint may be structured to indicate a resource action candidacy factor for the first stream operator at block 712. Generally, structuring can include arranging, assembling, programming, organizing, formulating, or otherwise formatting the first stream operator hint to indicate the resource action candidacy factor for the first stream operator. The resource action candidacy factor may include an indication of the suitability of the first stream operator for a particular resource action. In embodiments, the resource action candidacy factor may be expressed as an integer between 0 and 100, where greater integers represent greater suitability for a particular resource action, and lesser integers represent lower suitability for a particular resource action. In certain embodiments, the resource action candidacy factor may be expressed as a binary value (e.g., 0 or 1, yes or no). For instance, the resource action candidacy factor may indicate stream operators within the stream computing application that are suitable (e.g., good candidates) for one or more resource actions (e.g., sleep mode, shut-down mode), or stream operators within the stream computing application that are not suitable (e.g., not good candidates) for one or more resource actions. In embodiments, structuring may include formatting the first stream operator hint to include an assigned resource action candidacy factor. In embodiments, structuring may include appending the resource action candidacy factor to the first stream operator hint by a machine-learning technique (e.g., configured to derive the resource action candidacy factor based on the configuration of the stream operator, historical usage data). In embodiments, structuring may include tagging the first stream operator hint with a recommendation of a developer regarding resource actions that should or should not be performed with respect to the first stream operator. As an example, a first stream operator may be associated with a first stream operator hint having a resource action candidacy factor that indicates a suitability value of 80 with respect to a sleep mode, a suitability value of 54 with respect to a hibernation mode, and a suitability value of 22 with respect to a shut-down mode. Other methods of structuring the first stream operator hint to indicate the resource action candidacy factor are also possible.

At block 720, the first stream operator hint may be detected (e.g., sensed, recognized, discovered, identified, ascertained, determined). In embodiments, detecting the first stream operator hint may include examining a set of metadata associated with the set of stream operators, and ascertaining the first stream operator hint associated with the first stream operator. In embodiments, the first stream operator hint may be extracted for analysis (e.g., for use in determining a resource action). At block 740, a resource action may be determined (e.g., derived, calculated, computed, identified, formulated, ascertained) based on the first stream operator hint. In embodiments, determining the resource action may include examining the first stream operator hint to identify one or more resource actions expected to be associated with positive impacts with respect to resource usage in the stream computing environment (e.g., as indicated by the first stream operator hint and the resource action candidacy factor). At block 760, the resource action may be performed (e.g., carried-out, implemented, enacted, instantiated, completed, executed) with respect to the stream operator to benefit resource usage in the stream computing environment. In embodiments, performing may include utilizing a streams management engine to execute a resource action indicated by the first stream operator hint. As an example, in response to determining that a first stream operator hint indicates that a resource action of "sleep mode" is suitable with respect to the first stream operator, the streams management engine may configure the first stream operator to a sleep mode. Other methods of resource management in a stream computing environment are also possible. The method 700 may conclude at block 799. The method 700 may be associated with performance and efficiency benefits (e.g., resource management efficiency, network bandwidth, and application performance) with respect to resource usage management in a stream computing environment.

Figure 8:
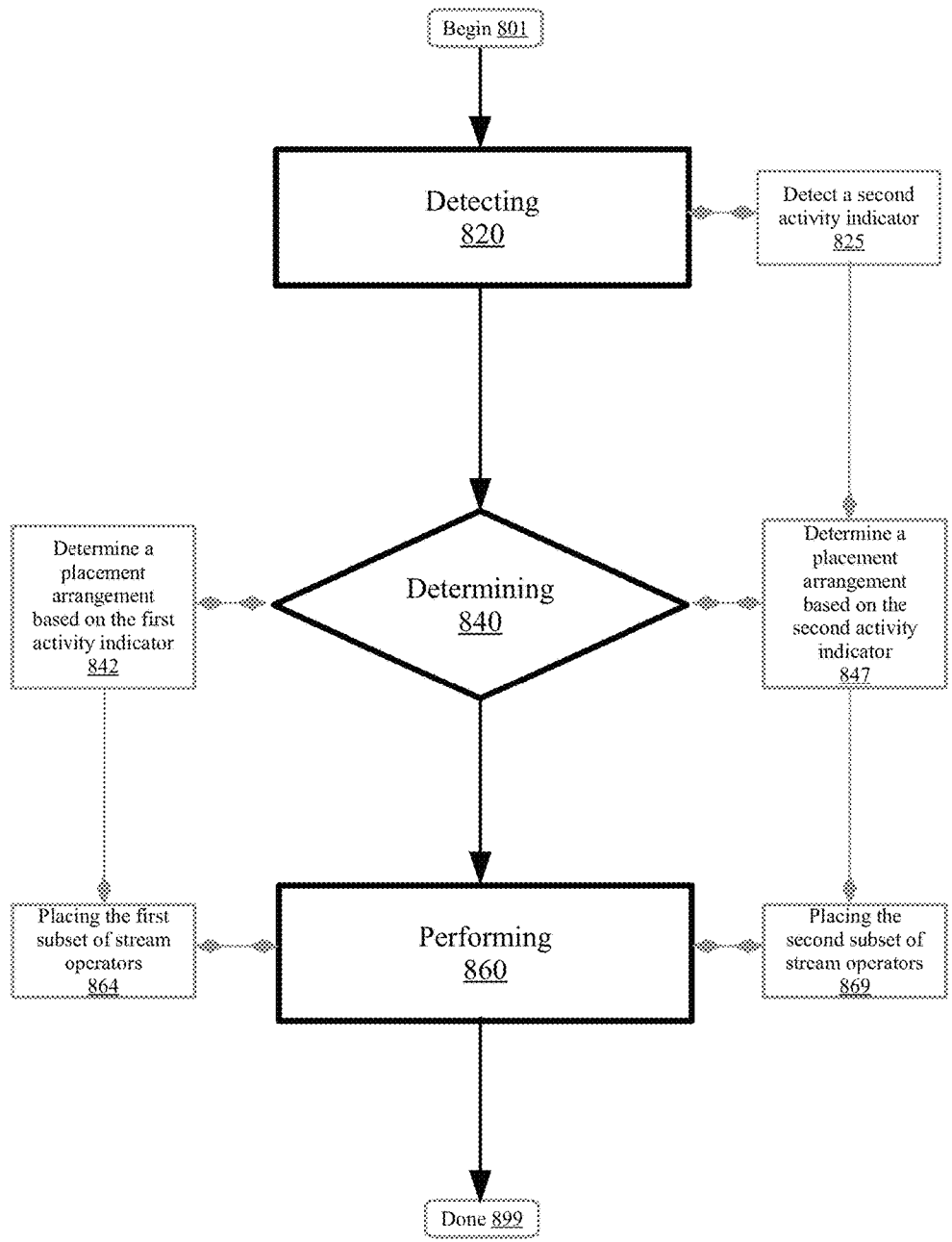
FIG. 8 is a flowchart illustrating a method for resource usage management in a stream computing environment that includes a set of hosts having a set of processing elements which has a set of stream operators, according to embodiments.

FIG. 8 is a flowchart illustrating a method 800 for resource usage management in a stream computing environment that includes a set of hosts having a set of processing elements which has a set of stream operators, according to embodiments. Aspects of FIG. 8 relate to determining a placement arrangement with respect to a subset of the set of stream operators based on an activity indicator for the set of stream operators. Aspects of method 800 may be similar or the same as aspects of method 600/700, and aspects may be utilized interchangeably with one or more methodologies described herein. Method 800 may begin at block 801. At block 820, a first activity indicator for a first subset of the set of stream operators may be detected. At block 840, a resource action for performance with respect to the first subset of the set of stream operators may be determined based on the first activity indicator for the first subset of the set of stream operators. At block 860, the resource action may be performed with respect to the first subset of the set of stream operators to benefit resource usage in the stream computing environment.

In embodiments, a placement arrangement with respect to the first subset of the set of stream operators and the set of hosts may be determined at block 842. The placement arrangement may be determined based on the first activity indicator for the first subset of the set of stream operators. Generally, determining can include calculating, computing, identifying, formulating, resolving, or otherwise ascertaining the placement arrangement with respect to the first subset of the set of stream operators and the set of hosts. The placement arrangement may include a configuration for deployment of stream operators and processing elements to particular hosts (e.g., servers, workstations, compute nodes) of the set of hosts. For instance, the placement arrangement may indicate a recommendation of which stream operators should be allocated to which hosts of the set of hosts. As described herein, the placement arrangement may be determined based on the first activity indicator for the first subset of the set of stream operators. In embodiments, determining may include analyzing (e.g., examining, assessing) the level of activity (e.g., tuple throughput rate, time between tuple arrival, duration of active time, times/conditions when the level of activity fluctuates) of the first subset of the set of stream operators as indicated by the first activity indicator, and ascertaining one or more hosts of the set of hosts that are associated with operating conditions conducive to the usage characteristics of the first subset of the set of stream operators. As an example, determining the placement arrangement may include ascertaining a first subset of stream operators associated with an activity level below an activity level threshold as indicated by the first activity indicator (e.g., stream operators that are used for less than 20% of the total time the stream application is running), and allocating them for isolated placement on a first host server (e.g., separate from other stream operators of the set of stream operators). Other methods of determining the placement arrangement with respect to the first subset of the set of stream operators and the set of hosts are also possible.

In embodiments, the first subset of the set of stream operators may be placed based on the placement arrangement at block 864. The first subset of the set of stream operators may be placed on a first subset of the set of hosts. As described herein, aspects of the disclosure relate to the recognition that deploying stream operators to host servers based on the usage characteristics of the stream operators may be associated with resource usage efficiency with respect to the stream computing environment. Accordingly, aspects of the disclosure relate to placing the first subset of the set of stream operators on the set of hosts. Generally, placing can include assigning, apportioning, designating, distributing, transferring, allocating, or otherwise deploying the first subset of the set of stream operators to the first subset of the set of hosts. In embodiments, placing may include utilizing a streams management engine to allocate the first subset of the set of stream operators to the first subset of the set of hosts as indicated by the placement arrangement. As an example, the streams management engine may parse the placement arrangement, and identify that a first subset of hosts is not currently hosting any other stream operators associated with the stream computing application (e.g., such that the first subset of the set of stream operators may be isolated on the first subset of host). Accordingly, the streams management engine may configure the first subset of hosts for receiving deployment of the first subset of stream operators. For instance, the streams management engine may partition storage space of the first subset of hosts to accommodate the first subset of stream operators, and allocate resources of the first subset of hosts for use by the first subset of stream operators. In response to configuring the first subset of hosts, the first subset of stream operators may be transferred to and established on the first subset of hosts. Other methods of placing the first subset of stream operators on the first subset of hosts are also possible.

In embodiments, a second activity indicator for a second subset of the set of stream operators may be detected at block 825. The first and second activity indicators may be different. Generally, detecting can include sensing, recognizing, discovering, identifying, ascertaining, or otherwise determining the second activity indicator for the second subset of the set of stream operators. The second subset of stream operators may include a group, batch, or portion of one or more stream operators of the set of stream operators. The second subset of stream operators may be different (e.g., mutually exclusive, such that no stream operator is a member of both the first and second subset) than the first subset of stream operators. For instance, the second subset of the set of stream operators may include a branch or channel of an operator graph that includes a number of stream operators separate from the first subset of stream operators. In embodiments, the second subset of the set of stream operators may be associated with a second activity indicator. The second activity indicator may include an index, gauge, expression, or representation of the degree or extent of usage of the second subset of the set of stream operators. As described herein, the second activity indicator may include a quantitative expression of the usage of the second subset of stream operators derived from a set of usage statistics (e.g., average tuple throughput rate of 500 tuples per second, length of time between tuple arrival of 3.6 seconds, percentage of maximum utilization of 9%). In embodiments, the second activity indicator may include an annotation, marker, note, tag, or label that indicates the relative usage level of the second subset of stream operators (e.g., machine-learning derived analysis or developer comment indicating when and how the second subset of stream operators are used). In embodiments, detecting the second activity indicator may include analyzing a set of archived usage data for the set of stream operators, and ascertaining the second activity indicator based on the historical usage data for the second subset of stream operators. In embodiments, detecting the second activity indicator may include receiving a notification (e.g., from a machine learning technique or application developer) that characterizes the relative activity of the second subset of stream operators. Other methods of detecting the second activity indicator for the second subset of stream operators are also possible.

In embodiments, a placement arrangement with respect to the second subset of the set of stream operators and the set of hosts may be determined based on the second activity indicator for the second subset of the set of stream operators at block 847. The placement arrangement may use a utilization-based packing criterion. Aspects of the disclosure relate to the recognition that, in some situations, it may be desirable to deploy stream operators to host servers based on utilization statistics. Accordingly, aspects of the disclosure relate to determining a placement arrangement (e.g., configuration for deployment of stream operators and processing elements to particular hosts, recommended/suggested allocation strategies) with respect to the second subset of the set of stream operators and the set of hosts based on a utilization-based packing criterion. Generally, determining can include calculating, computing, identifying, formulating, resolving, or otherwise ascertaining the placement arrangement with respect to the second subset of the set of stream operators and the set of hosts. The placement arrangement may be determined based on the second activity indicator for the first subset of the set of stream operators and use the utilization-based packing criterion. The utilization-based packing criterion may include a guideline, principle, recommendation, instruction, or rule to group stream operators that have similar usage characteristics for allocation to the same host(s). In embodiments, the utilization-based packing criterion may be formulated based on actual historical usage statistics for the second subset of stream operators, or on expected/predicted usage levels for the second subset of stream operators. For instance, the utilization-based packing criterion may designate that stream operators having an activity level above an activity level threshold should be grouped together for placement on a first subset of hosts, and that stream operators having an activity level below an activity level threshold should be grouped together for placement on a first subset of hosts.

As an example, determining the placement arrangement may include ascertaining that a first subset of stream operators are predicted to be associated with an activity level greater than an activity level threshold as indicated by a first activity indicator (e.g., based on historical usage data, it may be predicted that the first subset of stream operators are expected to receive a tuple throughput rate of 1500 tuples per second, achieving an activity level threshold of 800 tuples per second). It may be ascertained that a second subset of stream operators are predicted to be associated with an activity level lesser than an activity level threshold as indicated by a second activity indicator (e.g., the second set of stream operators are expected to receive a tuple throughput rate of 200 tuples per second, failing to achieve the activity level threshold of 800 tuples per second). Accordingly, a placement arrangement may be generated that designates the first subset of stream operators for allocation to a first subset of hosts, and the second subset of stream operators for allocation to a second subset of hosts. Other methods of determining the placement arrangement with respect to the second subset of the set of stream operators and the set of hosts are also possible.

In embodiments, the second subset of the set of stream operators may be placed based on the placement arrangement at block 869. The second subset of the set of stream operators may be placed on a second subset of the set of hosts. Generally, placing can include assigning, apportioning, designating, distributing, transferring, allocating, or otherwise deploying the second subset of the set of stream operators to the second subset of the set of hosts. In embodiments, placing may include utilizing a streams management engine to allocate the second subset of the set of stream operators to the second subset of the set of hosts as indicated by the placement arrangement. In embodiments, the second subset of the set of hosts and the first subset of the set of hosts may be mutually exclusive, such that no host is a member of both the first subset and the second subset (e.g., the first and second subsets include entirely separate hosts). As an example, the streams management engine may parse the placement arrangement, and identify that a second subset of hosts is not currently hosting any other stream operators associated with the stream computing application (e.g., such that the second subset of the set of stream operators may be isolated on the second subset of hosts). Accordingly, the streams management engine may configure the second subset of hosts for receiving deployment of the second subset of stream operators. For instance, the streams management engine may partition storage space of the first subset of hosts to accommodate the second subset of stream operators, and allocate resources of the second subset of hosts for use by the second subset of stream operators. In response to configuring the second subset of hosts, the second subset of stream operators may be transferred to and established on the second subset of hosts. Other methods of placing the second subset of stream operators on the second subset of hosts are also possible. The method 800 may conclude at block 899. The method 800 may be associated with performance and efficiency benefits (e.g., resource management efficiency, network bandwidth, and application performance) with respect to resource usage management in a stream computing environment.

Figure 9:
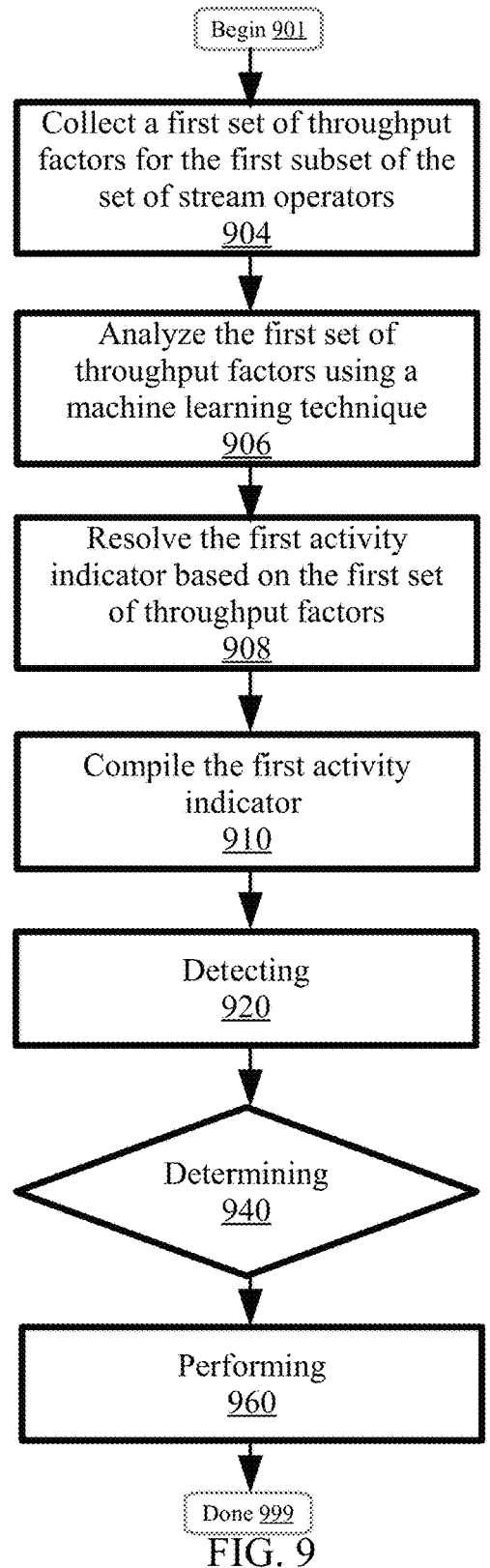
FIG. 9 is a flowchart illustrating a method for resource usage management in a stream computing environment that includes a set of hosts having a set of processing elements which has a set of stream operators, according to embodiments.

FIG. 9 is a flowchart illustrating a method 900 for resource usage management in a stream computing environment that includes a set of hosts having a set of processing elements which has a set of stream operators, according to embodiments. Aspects of FIG. 9 relate to compiling an activity indicator for a subset of stream operators based on a set of throughput factors collected for the subset of stream operators. Aspects of method 900 may be similar or the same as aspects of method 600/700/800, and aspects may be utilized interchangeably with one or more methodologies described herein. Method 900 may begin at block 901. At block 920, a first activity indicator for a first subset of the set of stream operators may be detected. At block 940, a resource action for performance with respect to the first subset of the set of stream operators may be determined based on the first activity indicator for the first subset of the set of stream operators. At block 960, the resource action may be performed with respect to the first subset of the set of stream operators to benefit resource usage in the stream computing environment.

In embodiments, a first set of throughput factors for the first subset of the set of stream operators may be collected at block 904. The first set of throughput factors may be collected by monitoring the stream computing environment. Generally, collecting can include gathering, assembling, accumulating, obtaining, acquiring, aggregating, or otherwise capturing the first set of throughput factors for the first subset of the set of stream operators. The first set of throughput factors may include statistics, measurements, historical usage data, or other information that indicates tuple flow patterns with respect to the first subset of the set of stream operators. For instance, the first set of throughput factors may include data regarding the minimum, maximum, and average tuple throughput rates of the first subset of stream operators. For example, the first set of throughput factors may indicate that the first subset of stream operators have a minimum (e.g., idle) throughput rate of 22 tuples per second, an average tuple throughput rate of 400 tules per second, and a maximum (peak) throughput rate of 800 tuples per second. As additional examples, the first set of throughput factors may characterize the transit times of tuples with respect to the first subset of stream operators (e.g., 4 seconds to be processed and pass through the first subset), the latency of tuples with respect to other channels/branches of the operator graph (e.g., Channel A is 0.6 seconds delayed with respect to Channel B), the total number of tuples processed by the first subset of stream operators in a given temporal period (e.g., 24,000 tuples processed in a 1 minute period), the duration of time the first subset of stream operators has a tuple throughput rate above a defined threshold (e.g., 2 hours a day with a tuple throughput rate above 500 tuples per second), or other throughput properties of the first subset of stream operators. In embodiments, collecting the first set of throughput factors may include using a streams management engine to monitor (e.g., scan, supervise, oversee) the data traffic processed by the first subset of stream operators. For instance, the streams management engine may record the data traffic information (e.g., tuple flow patterns, transit times, throughput rates) in a data traffic log for later analysis. Other methods of collecting the first set of throughput factors for the first subset of the set of stream operators are also possible.

In embodiments, the first set of throughput factors for the first subset of the set of stream operators may be analyzed at block 906. The first set of throughput factors may be analyzed using a machine learning technique to profile (e.g., describe, characterize, survey) the first subset of the set of stream operators. Generally, analyzing can include determining information regarding the characteristics or properties of the first set of throughput factors (e.g., parameters/ conditions that influence the throughput factors). Analyzing can include examining (e.g., performing an inspection of the first set of throughput factors), evaluating (e.g., generating an appraisal of the first set of throughput factors), resolving (e.g., ascertaining an observation/conclusion/answer with respect to the first set of throughput factors), parsing (e.g., deciphering structured and unstructured data constructs of the first set of throughput factors), querying (e.g., asking a question regarding the first set of throughput factors), or categorizing (e.g., organizing by a feature or type of the first set of throughput factors). In embodiments, analyzing may include examining the first set of throughput factors to extract properties or attributes that describe trends, patterns, or relationships exhibited by the first set of throughput factors. For instance, analyzing may include evaluating the tuple flow rate with respect to the first subset of stream operators over time to determine branches or channels of an operator graph that may be candidates for a resource action. As an example, analyzing may include using a statistical analysis technique to identify a temporal-based pattern with respect to the first set of throughput factors that indicates a tuple throughput rate increase of 600% for a four hour period between 7:00 PM and 11:00 PM each evening (e.g., data volumes related to business transactions may be processed after business hours). An associative rule-based learning technique may analyze the identified temporal-based pattern, and assemble a rule-based model indicating recommended/suggested usage patterns for the first subset of stream operators (e.g., stream operators may be deactivated for time periods prior to 7:00 PM or after 11:00 PM, may be active for peak processing between 7:00 PM and 11:00 PM). The rule-based model may be used as a basis for the first set of throughput factors. Other methods of analyzing the first set of throughput factors are also possible.

In embodiments, aspects of the disclosure relate to analyzing the first set of throughput factors for the first subset of the set of stream operators using a machine-learning technique. The machine-learning technique may include one or more algorithms that allow computer systems to learn without being explicitly programmed. The machine learning technique may include a method of data analysis that automates analytical model building. The machine-learning technique may be configured to use algorithms that iteratively learn from data to recognize patterns, form deductions, and generate conclusions without being explicitly programmed to do so. The machine-learning technique may use computational statistics methods, predictive analytic methods, and pattern recognition techniques to identify trends in data, and generate models, relationship, hypotheses, and rules based on the identified trends. As examples, the machine-learning technique may include decision tree learning techniques (e.g., decision tree as a predictive model), associative rule-based learning techniques (e.g., to discover relations between variables), artificial neural networks (e.g., non-linear statistical data modeling tools to represent complex relationships between inputs and outputs, capture statistical structures in unknown joint probability distributions), deep learning techniques (e.g., modeling of high level abstractions in data using multiple processing layers including linear and non-linear transformations), inductive logic programming techniques (e.g., hypothesis derivation; logic programs that entails positive examples), support vector machines (e.g., classification and regression methods), clustering techniques (e.g., drawing observations from similar and dissimilar data structures), Bayesian networks (e.g., probabilistic graphic model that represents a set of random variables and their conditional independencies using a directed acyclic graph), reinforcement learning techniques (e.g., policy recognition that maps states to actions), representation learning techniques (e.g., discovering representations of inputs based on training), similarity and metric learning techniques (e.g., distinction between similar and dissimilar object pairs), sparse dictionary learning techniques (e.g., representing data as a linear combination of basis functions), rule-based machine learning techniques (e.g., method that identifies, learns, or evolves rules to store, manipulate, or apply knowledge), or learning classifier systems (e.g., context-dependency analysis). Other types of machine learning techniques are also possible.

In embodiments, the first activity indicator for the first subset of the set of stream operators may be resolved at block 908. The first activity indicator may be resolved based on the first set of throughput factors for the first subset of the set of stream operators. Generally, resolving can include computing, identifying, ascertaining, formulating, or otherwise determining the first activity indicator. As described herein, the first activity indicator may include an index, gauge, expression, or representation of the degree or extent of usage of the first subset of the set of stream operators. The first activity indicator may include a quantitative expression of the usage of the first subset of stream operators derived from a set of usage statistics. In embodiments, resolving can include formulating the first activity indicator based on the results of analyzing the first set of throughput factors. For instance, resolving may include extracting the properties and attributes of the first set of throughput factors yielded by the machine learning technique analysis of the set of throughput factors, and ascertaining those aspects that characterize the usage profile (e.g., activity level) of the first set of stream operators. In embodiments, resolving may include comparing the first set of throughput factors with a set of threshold throughput values, and ascertaining a relationship between the first set of throughput factors and the set of threshold throughput values (e.g., throughput factor of 600 tuples per second may achieve a threshold throughput value of 500 tuples per second). Accordingly, the relationship between the set of throughput factors and the set of threshold throughput values may be characterized for inclusion in the first activity indicator. Other methods of resolving the first activity indicator are also possible.

In embodiments, the first activity indicator for the first subset of the set of stream operators may be compiled at block 910. Generally, compiling can include assembling, integrating, accumulating, editing, collecting, constructing, aggregating, formatting, organizing, generating, or otherwise establishing the first activity indicator for the first subset of the set of stream operators. In embodiments, compiling may include aggregating the results of the tuple throughput factor analysis into an integrated form to characterize the degree or extent of usage of the first subset of the set of stream operators. For instance, compiling may include generating a series of charts or graphs displaying the usage of the first subset of stream operators over a particular temporal period (e.g., a day, a week, a month), creating a text-based description of the usage configuration of the subset of stream operators, organizing a set of statistics in a database that exhibit how the usage of the first subset of stream operators reacts to different operational conditions, triggers, or stimuli, or the like. In embodiments, compiling may include formatting the usage characteristics derived from the analysis of the set of throughput factors into a usage profile for the first subset of stream operators. As an example, the usage profile may indicate information including the maximum, minimum, and average tuple processing speeds, peak tuple processing hours, tuple latency factors, traffic patterns, and other properties of the activity of the first subset of stream operators. Other methods of compiling the first activity indicator for the first subset of stream operators are also possible. The method 900 may conclude at block 999. The method 900 may be associated with performance and efficiency benefits (e.g., resource management efficiency, network bandwidth, and application performance) with respect to resource usage management in a stream computing environment.

Figure 10:
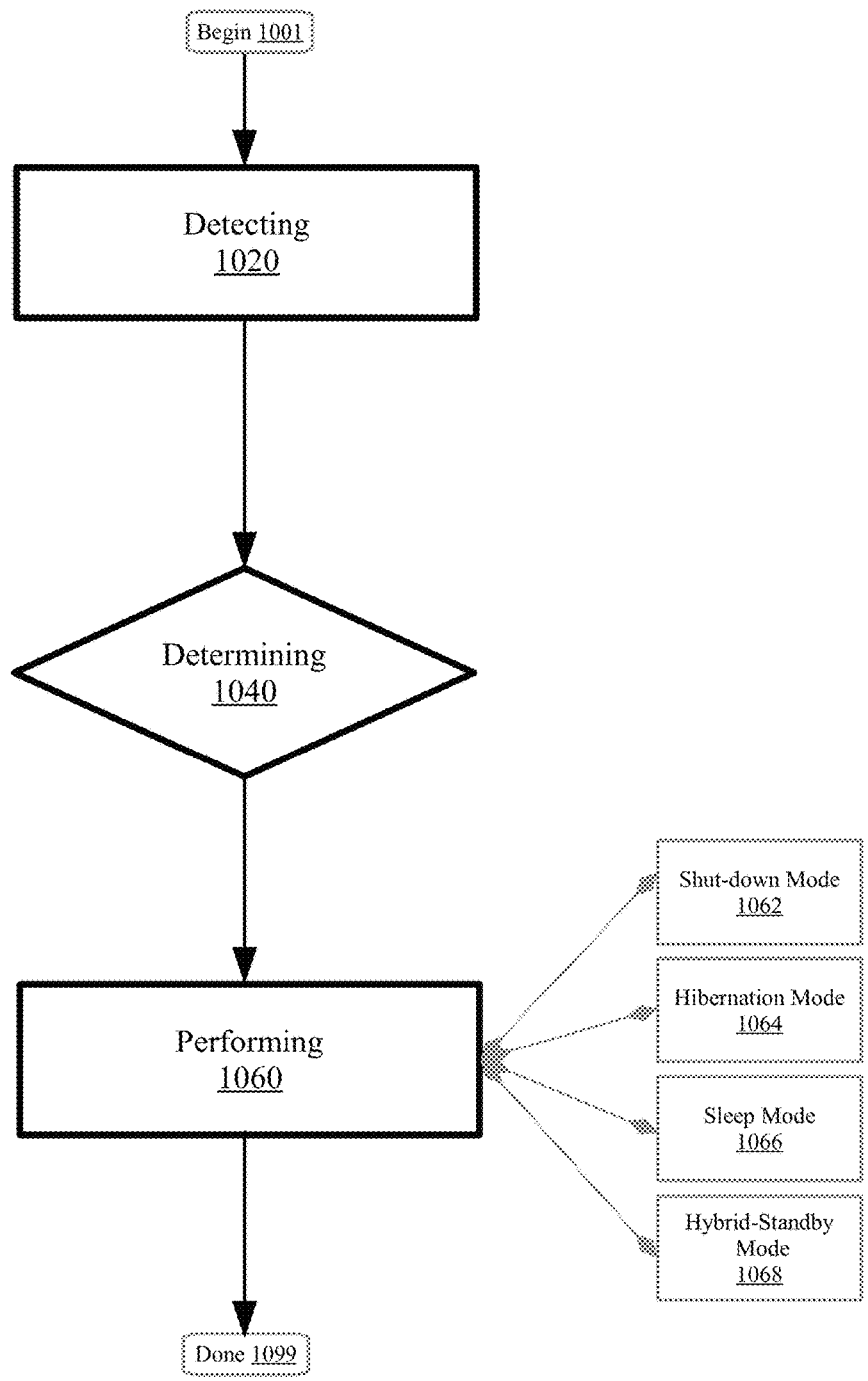
FIG. 10 is a flowchart illustrating a method for resource usage management in a stream computing environment that includes a set of hosts having a set of processing elements which has a set of stream operators, according to embodiments.

FIG. 10 is a flowchart illustrating a method 1000 for resource usage management in a stream computing environment that includes a set of hosts having a set of processing elements which has a set of stream operators, according to embodiments. Aspects of FIG. 10 relate to performing a resource action with respect to the first subset of the set of stream operators. The resource action may include carrying-out one or more of a plurality of operational modes with respect to the first subset of the set of stream operators. Aspects of method 1000 may be similar or the same as aspects of method 600/700/800/900, and aspects may be utilized interchangeably with one or more methodologies described herein. Method 1000 may begin at block 1001. At block 1020, a first activity indicator for a first subset of the set of stream operators may be detected. At block 1040, a resource action for performance with respect to the first subset of the set of stream operators may be determined based on the first activity indicator for the first subset of the set of stream operators. At block 1060, the resource action may be performed with respect to the first subset of the set of stream operators to benefit resource usage in the stream computing environment.

In embodiments, a shut-down mode may be carried out with respect to the first subset of the set of stream operators at block 1062. The shut-down mode may be carried-out to perform the resource action with respect to the first subset of the set of stream operators. Generally, carrying-out can include implementing, enacting, instantiating, or otherwise performing the shut-down mode with respect to the first subset of the set of stream operators. The shut-down mode may include an operational configuration in which a stream operator, processing element, or host is powered-down, turned-off, disabled. In embodiments, stream operators, processing elements, and hosts in a shut-down mode may not be configured for tuple handling or processing, and may not make use of system resources. In embodiments, carrying-out the shut-down mode may include removing power from one or more stream operators or processing elements of the first subset of stream operators. In embodiments, carrying-out the shut-down mode may include removing power from a host (e.g., server, virtual machine, workstation) to which one or more stream operators of the first subset of stream operators have been deployed. In certain embodiments, in response to carrying-out the shut-down mode, the tuple flow paths, physical topology, or logical topology of the stream computing environment may be modified. As an example, the tuple traffic that was previously processed by the first subset of stream operators may be re-routed to other stream operators, processing elements, or hosts of the stream computing environment, such that carrying-out the shut-down mode with respect to the set of stream-operators does not result in data loss or tuple processing delay. As described herein, carrying-out the shut-down mode with respect to the first subset of stream operators may positively impact resource usage in the stream computing environment (e.g., the first subset of stream operators may no longer use system resources, freeing the resources for use by other tasks). Other methods of carrying-out the shut-down mode with respect to the first subset of the set of stream operators are also possible.

In embodiments, a hibernation mode may be carried-out with respect to the first subset of the set of stream operators at block 1064. The hibernation mode may be carried-out to perform the resource action with respect to the first subset of the set of stream operators. Generally, carrying-out can include implementing, enacting, instantiating, or otherwise performing the hibernation mode with respect to the first subset of the set of stream operators. The hibernation mode may include an operational configuration in which a stream operator, processing element, or host is maintained in a low-power, low-resource usage state. In embodiments, stream operators, processing elements, and hosts in a hibernation mode may not be configured for tuple handling or processing, and may use power and system resources below a threshold (e.g., little to no power or resource usage). In embodiments, carrying-out the hibernation mode may include decreasing power to a stream operator, processing element, or host to which one or more stream operators of the first subset have been deployed, and saving one or more tuples to a non-volatile memory system. For instance, in certain embodiments, the tuples addressed or routed to a stream operator, processing element, or host configured to hibernation mode may be saved to non-volatile storage such as a hard drive, solid state drive, optical disc, cloud or network based storage system, or the like. Accordingly, the stream operator, processing element, or host in hibernation mode may be configured to process or handle the stored tuples upon reactivation (e.g., awakening from hibernation mode). As described herein, carrying-out the hibernation mode with respect to the first subset of stream operators may positively impact resource usage in the stream computing environment (e.g., the first subset of stream operators may no longer use system resources, freeing the resources for use by other tasks). Other methods of carrying-out the hibernation mode with respect to the first subset of the set of stream operators are also possible.

In embodiments, a sleep mode may be carried-out with respect to the first subset of the set of stream operators at block 1066. The sleep mode may be carried-out to perform the resource action with respect to the first subset of the set of stream operators. Generally, carrying-out can include implementing, enacting, instantiating, or otherwise performing the sleep mode with respect to the first subset of the set of stream operators. The sleep mode may include an operational configuration in which a stream operator, processing element, or host is maintained in a low-power, low-resource usage state. In embodiments, stream operators, processing elements, and hosts in sleep mode may not be configured for tuple handling or processing, and may use power and system resources below a threshold (e.g., little to no power or resource usage). In embodiments, carrying-out the sleep mode may include reducing power to a stream operator, processing element, or host to which one or more stream operators of the first subset have been deployed, and saving one or more tuples to a volatile memory system. For instance, in certain embodiments, the tuples addressed or routed to a stream operator, processing element, or host configured to sleep mode may be saved to volatile memory storage such as dynamic random-access memory, static random-access memory, integrated random-access memory, cache memory, or the like. Accordingly, the stream operator, processing element, or host in sleep mode may be configured to process or handle the saved tuples upon reactivation (e.g., awakening from sleep mode). In embodiments, carrying-out the sleep mode may include defining one or more activation triggers. The activation triggers may include conditions, criteria, settings, configurations, or parameters that delineate situations in which the stream operators, processing elements, or hosts in sleep mode may be configured to re-activate for tuple processing. As an example, activation triggers may be defined that indicate that stream operators should reactivate in response to saved tuples achieving a threshold (e.g., number of tuples such as 1000 saved tuples, data size such as 2 gigabytes of saved tuple data), a temporal threshold (e.g., re-activate after a time period such as 4 hours, re-activate at a certain time such as 8:00 AM), or the like. As described herein, carrying-out the sleep mode with respect to the first subset of stream operators may positively impact resource usage in the stream computing environment (e.g., the first subset of stream operators may no longer use system resources, freeing the resources for use by other tasks). Other methods of carrying-out the sleep mode with respect to the first subset of the set of stream operators are also possible.

In embodiments, a hybrid-standby mode may be carried-out with respect to the first subset of the set of stream operators at block 1068. The hybrid-standby mode may be carried-out to perform the resource action with respect to the first subset of the set of stream operators. Generally, carrying-out can include implementing, enacting, instantiating, or otherwise performing the hybrid-standby mode with respect to the first subset of the set of stream operators. The hybrid-standby mode may include an operational configuration in which a stream operator, processing element, or host is maintained in a low-power, low-resource usage state. In embodiments, stream operators, processing elements, and hosts in hybrid-standby mode may not be configured for tuple handling or processing, and may use power and system resources below a threshold (e.g., little to no power or resource usage). In embodiments, carrying-out the hybrid-standby mode may include reducing power to a stream operator, processing element, or host to which one or more stream operators of the first subset have been deployed, and saving one or more tuples to both a volatile memory storage system and a non-volatile memory storage system. For instance, in certain embodiments, the tuples addressed or routed to a stream operator, processing element, or host configured to the hybrid-standby mode may be saved to volatile memory storage such as dynamic random-access memory, static random-access memory, integrated random-access memory, or cache memory, saved to non-volatile memory storage such as a hard drive, solid state drive, optical disc, cloud or network based storage system, or saved to both. In embodiments, storing the tuples may include saving a copy of the received tuples to both the volatile memory storage system and the non-volatile memory storage system. In embodiments, storing may include sorting the received tuples, and saving a first subset of tuples (e.g., tuples that are more important, include sensitive data, have greater file sizes) to the non-volatile memory storage system, and saving a second subset of tuples (e.g., tuples that are less important, do not include sensitive data, have lesser file sizes) to the volatile-memory storage system. Accordingly, the stream operator, processing element, or host in the hybrid-standby mode may be configured to process or handle the saved tuples upon reactivation (e.g., awakening from sleep mode). As described herein, carrying-out the sleep mode with respect to the first subset of stream operators may positively impact resource usage in the stream computing environment (e.g., the first subset of stream operators may no longer use system resources, freeing the resources for use by other tasks) without data loss. Other methods of carrying-out the hybrid-sleep mode with respect to the first subset of the set of stream operators are also possible. The method 1000 may conclude at block 1099. The method 1000 may be associated with performance and efficiency benefits (e.g., resource management efficiency, network bandwidth, and application performance) with respect to resource usage management in a stream computing environment.

Figure 11:
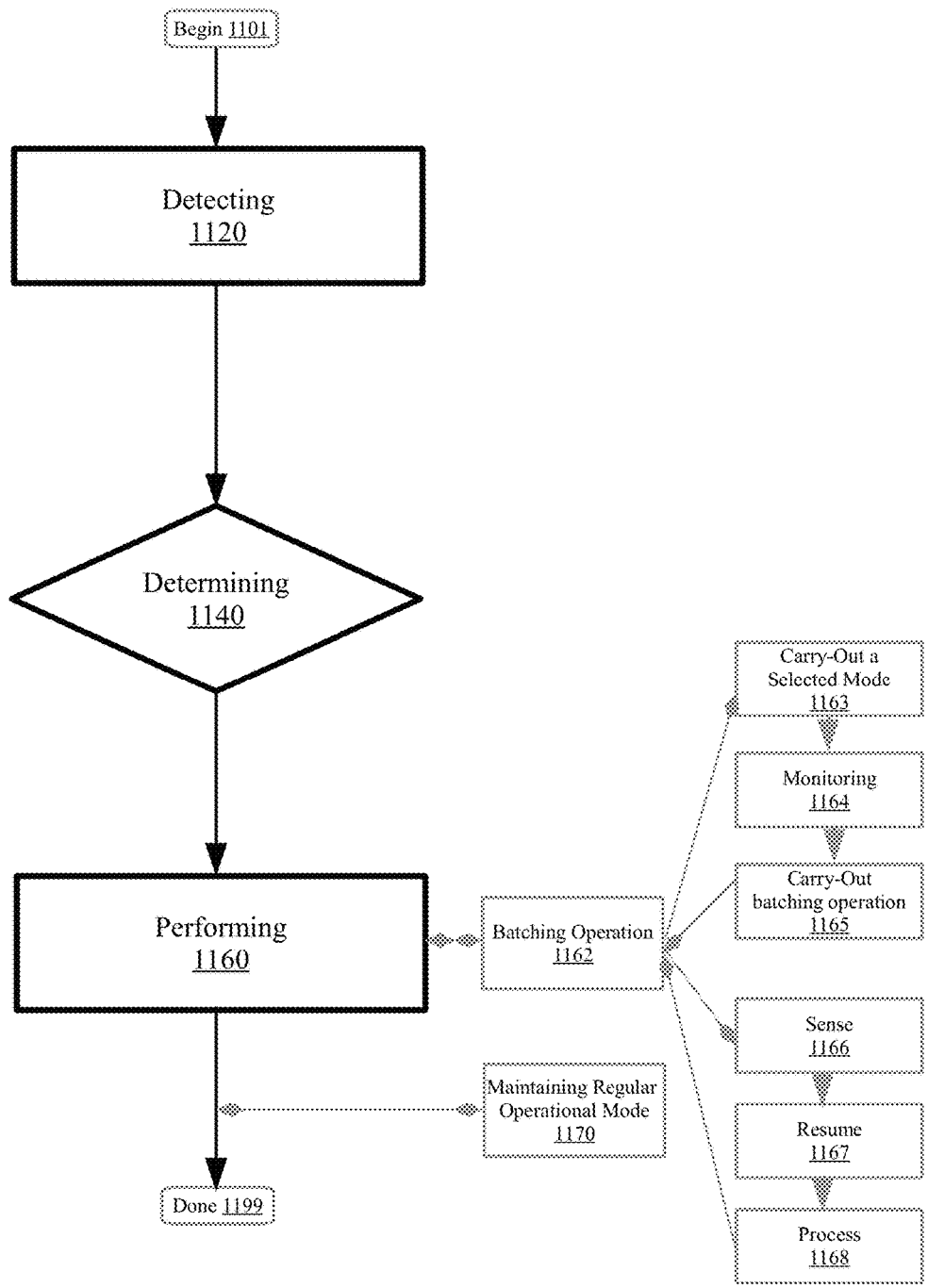
FIG. 11 is a flowchart illustrating a method for resource usage management in a stream computing environment that includes a set of hosts having a set of processing elements which has a set of stream operators, according to embodiments.

FIG. 11 is a flowchart illustrating a method 1100 for resource usage management in a stream computing environment that includes a set of hosts having a set of processing elements which has a set of stream operators, according to embodiments. Aspects of FIG. 11 relate to carrying-out a batching operation for a set of received tuples to perform the resource action with respect to the first subset of the set of stream operators. Aspects of method 1100 may be similar or the same as aspects of method 600/700/800/900/1000, and aspects may be utilized interchangeably with one or more methodologies described herein. Method 1100 may begin at block 1101. At block 1120, a first activity indicator for a first subset of the set of stream operators may be detected. At block 1140, a resource action for performance with respect to the first subset of the set of stream operators may be determined based on the first activity indicator for the first subset of the set of stream operators. At block 1160, the resource action may be performed with respect to the first subset of the set of stream operators to benefit resource usage in the stream computing environment.

In embodiments, a batching operation may be carried-out for a set of received tuples at block 1162. The batching operation may be carried-out at an input with respect to the first subset of the set of stream operators to perform the resource action with respect to the first subset of the set of stream operators. Generally, carrying-out can include implementing, enacting, instantiating, or otherwise performing the batching operation for the set of received tuples. The batching operation may include a process, procedure, or other operation for temporarily saving, storing, or maintaining a set of tuples for later processing. As described herein, aspects of the disclosure relate to the recognition that, in some situations, stream operators, processing elements, or hosts may receive tuples while they are configured to a shut-down mode, sleep mode, hibernation mode, hybrid-standby mode, or other mode in which they are unable to process or manage the received tuples. Accordingly, aspects of the disclosure relate to performing a batching operation to store the received tuples for processing once the first subset of the set of stream operators resume normal operation. In embodiments, carrying-out the batching operation may include utilizing a streams management engine to monitor one or more input ports (e.g., interfaces for data reception) of the first subset of stream operators, and collecting all tuples received by the one or more input ports for storage on a volatile memory storage system or non-volatile memory storage system. For instance, received tuples may be collected and stored in main memory of a host node until a first storage threshold (e.g., 4 gigabytes) is reached, and remaining tuples may be stored to a disk storage system. In embodiments, the first subset of stream operators may be configured to process the batched tuples upon resuming normal operation. For instance, the first subset of stream operators may access the memory device to which the received tuples were saved, and load them for processing. Other methods of carrying-out the batching operation are also possible.

In embodiments, a selected mode may be carried-out with respect to the first subset of the set of stream operators at block 1163. The selected mode may be selected from a group consisting of a shut-down mode, a hibernation mode, a sleep mode, and a hybrid-standby mode. In embodiments, carrying-out the selected mode may include analyzing the first activity indicator for the first subset of stream operators, and ascertaining a particular operational mode of the group to perform with respect to the stream-computing environment. Accordingly, the ascertained operational mode may then be implemented with respect to the first subset of stream operators. In embodiments, in response to carrying-out the selected mode, an input port may be monitored (e.g., scanned, audited, observed, supervised) for the set of received tuples at block 1164. For instance, monitoring may include utilizing the streams management engine to continuously or periodically scan the one or more input ports of the first subset of stream operators, and collecting the tuples received the by the input port for storage. In embodiments, the batching operation may be carried-out in response to monitoring the input port for the set of received tuples at block 1165. For instance, in certain embodiments, in response to monitoring the input port and detecting that a number of received tuples achieves a threshold (e.g., 500 received tuples), the batching operation may be carried-out. Accordingly, the received tuples may be collected and stored in memory for later processing. Other methods of carrying-out the selected mode, monitoring the input port, and carrying-out the batching operation are also possible.

In embodiments, a triggering event may be sensed at block 1166. Generally, sensing can include detecting, recognizing, discovering, identifying, ascertaining, or otherwise determining the triggering event. The triggering event may include a condition, designated criterion, stimulus, or occurrence that, when detected, initiates re-configuration (e.g., modification, switching) of the operational mode of the first subset of stream operators. For instance, the triggering event may include a threshold parameter that causes the first subset of stream operators to resume normal operation (e.g., reactivate from shut-down mode, sleep mode, hibernation mode, or hybrid-standby mode). As examples, the triggering event may include a specified time of day (e.g., 7:00 AM), a measured (e.g., actual) tuple throughput rate above a threshold (e.g., tuple throughput rate of 900 tuples per second exceeds a throughput threshold of 800 tuples per second), an expected tuple throughput rate above a threshold (e.g., predicted increase in network traffic), an accumulation of batched tuples above a threshold (e.g., 2000 saved tuples, 4 gigabytes of saved tuples), operator graph congestion (e.g., tuple build-up at one or more operators), transit time threshold (e.g., time to pass a tuple through the operator graph above/below 4 seconds), a second subset of stream operators being deactivated (e.g., such that the first subset becomes necessary), or the like. In embodiments, sensing the triggering event may include using the streams management engine to monitor one or more specified aspects of the stream computing environment (e.g., tuple throughput rate, operator graph congestion), and ascertaining that one or more designated thresholds are achieved. As an example, sensing the triggering event may include ascertaining that a predetermined time frame of 8 hours has elapsed, and that the stream computing environment is expected to experience an increase in network traffic. Other methods of sensing the triggering event are also possible.

In embodiments, a regular operational mode with respect to the first subset of the set of stream operators may be resumed at block 1167. Generally, resuming can include restarting, restoring, activating, reinstating, re-establishing, or otherwise returning the set of stream operators to the regular operational mode. The regular operational mode may include a normal, default, active mode in which the first subset of stream operators are configured for processing and performing operations with respect to the set of tuples. In embodiments, resuming the regular operational mode may include reactivating one or more stream operators, processing elements, or hosts from a shut-down mode, sleep mode, hibernation mode, or hybrid-standby mode. In embodiments, the set of received tuples may be processed by the first subset of stream operators at block 1168. Generally, processing can include analyzing, examining, handling, assessing, operating on, modifying, or otherwise managing the set of received tuples. In embodiments, processing may include configuring the first subset of stream operators to read a memory address of a storage device where the set of received tuples were saved. In this way, tuples of the stream computing environment may be processed without data loss (e.g., no tuples are lost when the operational mode of the first subset of stream operators is modified). Other methods of resuming the regular operational mode of the first subset of stream operators and processing the set of received tuples are also possible.

In embodiments, a regular operational mode may be maintained with respect to a second subset of the set of stream operators at block 1170. Generally, maintaining can include continuing, preserving, retaining, persisting, extending, or otherwise sustaining the regular operational mode. As described herein, aspects of the disclosure relate to performing a resource action (e.g., to temporarily modify the operational state of a first subset of stream operators) to benefit resource usage management of a stream computing environment. In embodiments, the resource action may be performed with respect to the first subset of stream operators, such that a second subset of stream operators may continue tuple processing operations in a regular operational mode. In embodiments, maintaining the regular operational mode may include instituting a lock on the second subset of stream operators, such that they may not be modified (e.g., removed from the regular operational mode) until a designated unlock criterion is achieved (e.g., the first subset of stream operators resume regular operation, new stream operators are added to the operator graph). In this way, portions of an operational graph may be temporarily deactivated (e.g., shut down, put to sleep, put in hibernation, put in a hybrid-standby mode) while maintaining a stream computing application in a healthy, running state without tuple loss. Other methods of maintaining the regular operational mode with respect to the second subset of stream operators are also possible. The method 1100 may conclude at block 1199. The method 1100 may be associated with performance and efficiency benefits (e.g., resource management efficiency, network bandwidth, and application performance) with respect to resource usage management in a stream computing environment.

Figure 12:
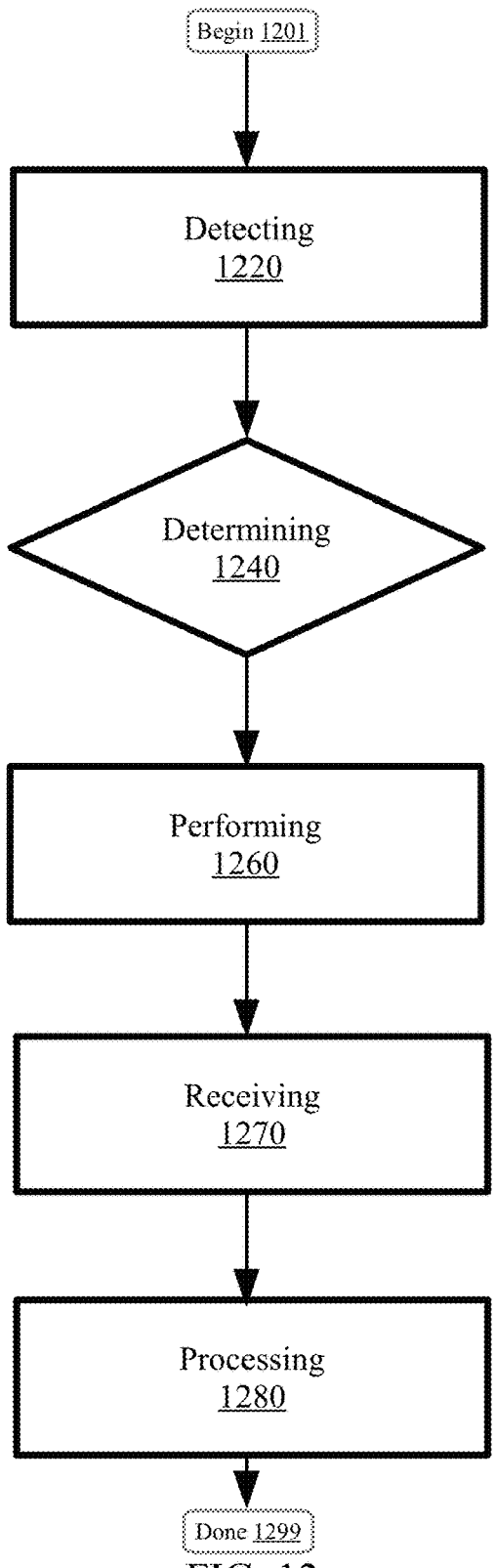
FIG. 12 is a flowchart illustrating a method for resource usage management in a stream computing environment that includes a set of hosts having a set of processing elements which has a set of stream operators, according to embodiments.

FIG. 12 is a flowchart illustrating a method 1200 for resource usage management in a stream computing environment that includes a set of hosts having a set of processing elements which has a set of stream operators, according to embodiments. Aspects of the method 1200 may relate to receiving and processing a stream of tuples. The method 1200 may begin at block 1201. At block 1220, a first activity indicator for a first subset of the set of stream operators may be detected. At block 1240, a resource action for performance with respect to the first subset of the set of stream operators may be determined based on the first activity indicator for the first subset of the set of stream operators. At block 1260, the resource action may be performed with respect to the first subset of the set of stream operators to benefit resource usage in the stream computing environment.

At block 1270, the stream of tuples may be received. The stream of tuples may be processed by a plurality of processing elements (e.g., stream operators) operating on a set of compute nodes (e.g., in a stream application environment). The stream of tuples may be received consistent with the description herein including FIGS. 1-12. Current/future processing by the plurality of processing elements may be performed consistent with the description herein including FIGS. 1-12. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 1280, the stream of tuples may be processed. The stream of tuples may be processed by the plurality of processing elements operating on the set of compute nodes. The stream of tuples may be processed consistent with the description herein including FIGS. 1-12. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators. The method 1200 may conclude at block 1299.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A method for resource usage management in a stream computing environment that includes a set of hosts having a set of processing elements which has a set of stream operators, comprising:
   detecting a first activity indicator for a first subset of a set of stream operators, the stream computing environment includes a set of hosts having a set of processing elements which include the set of stream operators, the detecting of the first activity for the first subset of the set of stream operators including a sensing of the first activity indicator, the first activity indicator being selected from the group consisting of: an index, a gauge, an expression, and a representation, wherein the first activity indicator indicates a degree of usage of the first subset of the set of stream operators, the first subset of the set of stream operators including logical processing units configured to perform operations on data, wherein the set of hosts are selected from the group consisting of: a virtual machine, a server, a workstation, and a mobile computing device;
   determining, based on the first activity indicator for the first subset of the set of stream operators, a resource action for performance with respect to the first subset of the set of stream operators, the resource action being selected from the group consisting of: a procedure, a configuration modification, a process, and an operation, and implementing the resource action to benefit a resource usage in the stream computing environment, the benefit of the resource usage including a modification to an operational mode of one or more stream operators of the set of stream operators;
   performing, to benefit the resource usage in the stream computing environment, the resource action with respect to the first subset of the set of stream operators, the performing of the resource action with respect to the first subset of the set of stream operators including a utilization of a streams management engine to reroute data traffic within the stream computing environment;
   ascertaining when the first subset of the set of stream operators are predicted to be associated with an activity level greater than an activity level threshold as indicated by the first activity indicator;
   maintaining the first subset of the set of stream operators on the set of hosts based on the first subset of the set of stream operators being predicted to be associated with the activity level greater than the activity level threshold;
   ascertaining when the first subset of the set of stream operators is associated with an activity level below the activity level threshold as indicated by the first activity indicator;
   allocating the first subset of the set of stream operators for isolated placement on a first host server based on the ascertaining of the first subset of the set of stream operators being associated with the activity level below the activity level threshold;
   separating other stream operators of the set of stream operators than the first subset of the set of stream operators based on the activity level being below the activity level threshold for the first subset of the set of stream operators;
   ascertaining when a second subset of the set of stream operators, being one of the separated other stream operators, are predicted to be associated with an activity level lesser than the activity level threshold as indicated by a second activity indicator; and
   designating the first subset of stream operators for allocation to a first subset of hosts, and designating the second subset of stream operators for allocation to a second subset of hosts, based on the ascertaining that the second subset of the set stream operators are predicted to be associated with the activity level lesser than the activity level threshold as indicated by the second activity indicator.

* * * * *